United States Patent
Sathyamurthy et al.

(10) Patent No.: US 10,162,667 B2
(45) Date of Patent: Dec. 25, 2018

(54) MULTI-VIRTUAL-MACHINE SNAPSHOT USING GUEST HYPERVISOR

(71) Applicant: VMWARE, INC., Palo Alto, CA (US)

(72) Inventors: Dattathreya Sathyamurthy, Bangalore (IN); Akhil Sadashiv Hingane, Bangalore (IN); Amrainder Singh, Bangalore (IN); Piyush Bharat Masrani, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 127 days.

(21) Appl. No.: 15/438,783

(22) Filed: Feb. 22, 2017

(65) Prior Publication Data
US 2018/0113733 A1   Apr. 26, 2018

(30) Foreign Application Priority Data
Oct. 20, 2016 (IN) .............................. 201641035961

(51) Int. Cl.
*G06F 9/455* (2018.01)
*G06F 9/48* (2006.01)
*G06F 9/46* (2006.01)

(52) U.S. Cl.
CPC .......... *G06F 9/45558* (2013.01); *G06F 9/461* (2013.01); *G06F 9/4856* (2013.01); *G06F 2009/4557* (2013.01)

(58) Field of Classification Search
None
See application file for complete search history.

(56) References Cited

U.S. PATENT DOCUMENTS

2015/0212893 A1* 7/2015 Pawar ................. G06F 11/1448
                                                   707/649
2017/0371691 A1* 12/2017 Gunti ................. G06F 9/45558

* cited by examiner

*Primary Examiner* — Diem K Cao
(74) *Attorney, Agent, or Firm* — Clifton Leon Anderson

(57) ABSTRACT

A process of obtaining, in effect, a multi-virtual-machine snapshot by taking a single-virtual-machine snapshot begins with creating, by a host hypervisor, a host virtual machine and a guest hypervisor. The guest hypervisor executes on the host virtual machine. Virtual machines to be included together in an effective multi-virtual-machine snapshot are migrated to the guest hypervisor. A single-virtual-machine snapshot is taken, by the host hypervisor, of the host virtual machine. The snapshot contains the state data for the virtual machines migrated to the guest hypervisor.

13 Claims, 4 Drawing Sheets

200

CREATE GUEST VM WITH GUEST HYERVISOR ON HOST HYPERVISOR 201

MIGRATE VM GROUP TO GUEST HYPERVISOR 202

SNAPSHOT OF GUEST VM 203

MULTI-VIRTUAL-MACHINE SNAPSHOT USING GUEST HYPERVISOR

RELATED APPLICATIONS

Benefit is claimed under 35 U.S.C. 119(a)-(d) to Foreign Application Serial No. 201641035961 filed in India. entitled "MULTI-VIRTUAL-MACHINE SNAPSHOT USING GUEST HYPERVISOR", on Oct. 20, 2016, by VMware, Inc., which is herein incorporated in its entirety by reference for all purposes.

BACKGROUND

A computer includes one or more processors, communications devices, and media. The media is used to store code, that is, physical representations of data. The communications devices provide for transferring code. The processors operate on some of the code (representing data) in accordance with other code representing executable data, i.e., instructions. Hereinbelow, as is common practice, context indicates whether "data" and "instructions" refer to abstract entities or to physical representations of those entities.

Instructions can be organized into programs that define the functionality of a computer hosting the programs. Initially, programs had to be re-coded to run on different computers. However, programs called "operating systems" were developed to provide a standard interface between other programs and the underlying computer hardware.

It can be desirable to transfer a computer's functionality to another computer; for example transfers can be useful for balancing workloads or responding to failures. An operating system can be designed to record its own state, the states of any programs running on the operating system, and the state of the hardware, on which the operating system runs. The resulting record can be used to reestablish that state on a new computer, provided the new computer is nominally the same as the old computer. In general, it is not generally feasible for a computer to assume a state of a computer with different hardware. However, the problems associated with hardware differences can, in effect, be smoothed over using virtual machines.

A virtual machine, i.e., a virtual computer, is not a computer or a machine, but is a program that functions as a computer that can host an operating system. While a computer along with the programs running on that computer is a combination is hardware and software, a virtual machine along with the programs running on it is all data. Therefore, unlike a real computer, a virtual machine can be stored in a file and/or transmitted over a network, e.g., from one computer to another, while preserving all the state information relevant to any programs running on the virtual machine.

A hypervisor is an operating system that virtualizes the hardware it controls to provide one or more virtual machines. Each virtual machine can host a guest operating system which, in turn, can host application and other programs. At least some hypervisors can take a snapshot of a virtual machine (executing on the hypervisor). The snapshot can be in the form of a file that can be stored, duplicated, and/or transferred to another computer running another instance of the same hypervisor. In either case, the snapshot preserves the state of the virtual machine when the snapshot was taken so that, upon restoration, the virtual machine can start from where it left off.

DETAILED DESCRIPTION

Many typical business applications, e.g., web services, database applications, and analytics, are multi-tiered, with the tiers being implemented in respective virtual machines. Recording an "application state" for a multi-tiered application can be a challenge. Hypervisors do not, in general, provide for multi-virtual-machine snapshots or for synchronized single-virtual-machine snapshots. There are algorithms for time-aligning single-virtual-machine snapshots, but the alignment is approximate and insufficient to ensure a consistent state. In accordance with the present invention, a process is presented that allows what is, in effect, a multi-machine snapshot to be taken using a single-virtual-machine snapshot.

The present innovation involves forming a "host" virtual machine having as its "guest" operating system, a "guest" hypervisor. Other virtual machines are migrated onto the guest hypervisor. The original host hypervisor then takes a snapshot of the host virtual machine. This snapshot includes the state data for all the virtual machines that were migrated to the guest hypervisor.

Figure 1:
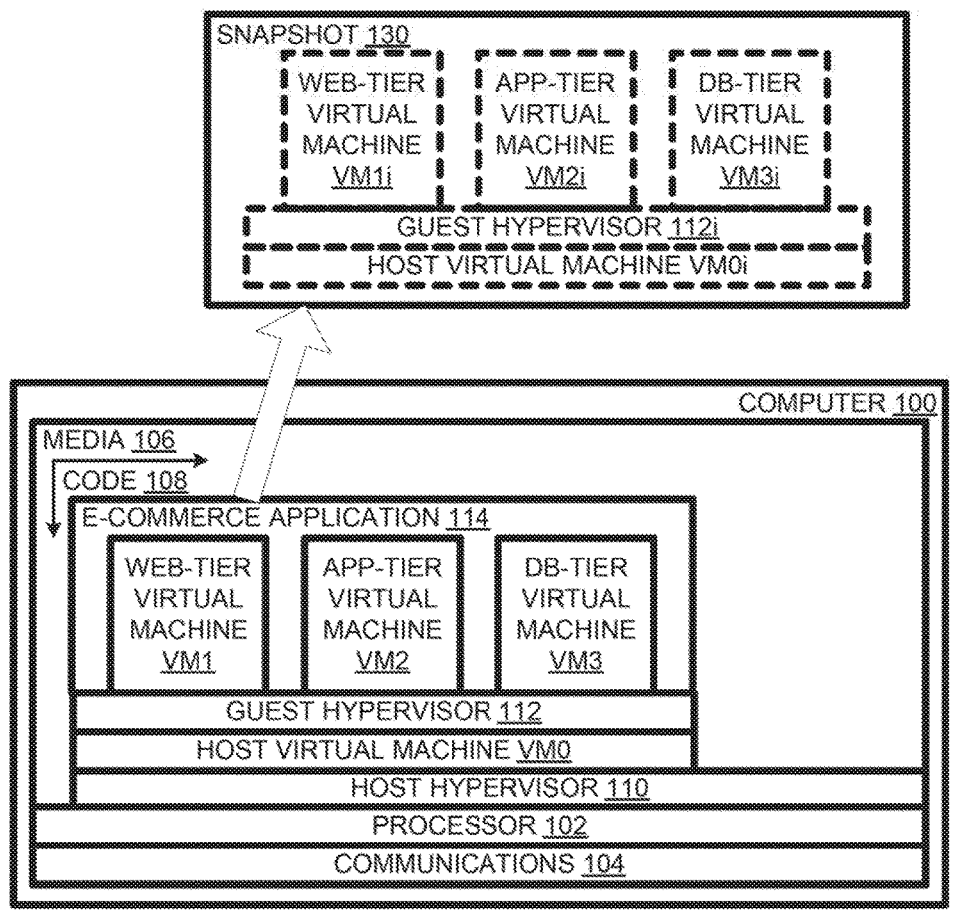
FIG. 1 is a schematic diagram of a computer and a snapshot of a host virtual machine running on a host hypervisor on the computer.

As shown in FIG. 1 a computer 100 includes a processor 102, communications devices 104, and non-transitory media 106. Media 106 is encoded with code 108 representing a host hypervisor 110, a host virtual machine VM0, a guest hypervisor 112, and an e-commerce application 114. In alternative embodiments, different applications include different numbers of virtual machines hosting different types of apps. In the illustrated case, e-commerce application 116 includes a web-tier virtual machine VM1, an app-tier virtual machine VM2, and a database-tier virtual machine VM3.

Host hypervisor 110 can take a snapshot 130 of host virtual machine VM0. Snapshot 130 includes the state image data 112$i$ for guest hypervisor 112, state image data VM0$i$ for host virtual machine VM0. The state image data VM0$i$ includes the state data VM1$i$ for virtual machine VM1, VM2$i$ for virtual machine VM2, and VM3$i$ for virtual machine VM3. Collectively, the single-virtual-machine snapshot 130 (of virtual machine VM0) includes all the state data needed to restore operation of virtual machines VM1, VM2, and VM3 on computer 110 or another computer having a instance of hypervisor 110. Accordingly, single-VM snapshot 130 is, in effect, a multi-VM snapshot.

Figure 2:
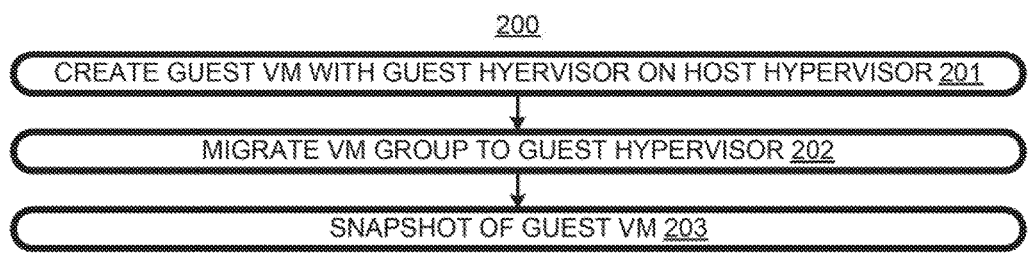
FIG. 2 is a flow chart of a process for taking a snapshot of a virtual machine that preserves a consistent state for plural virtual machines.
Figure 3:
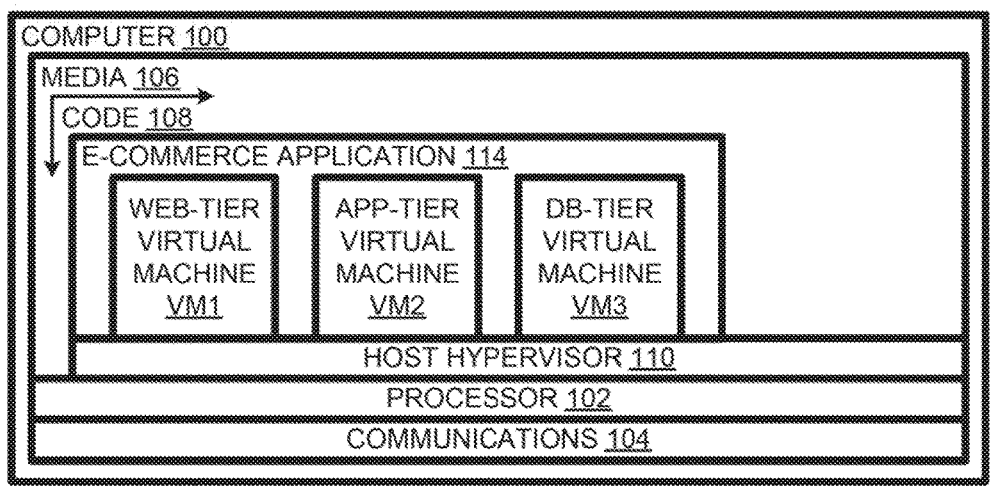
FIG. 3 is a schematic diagram of the computer of FIG. 1 prior to creation of the host virtual machine of FIG. 1.
Figure 4:
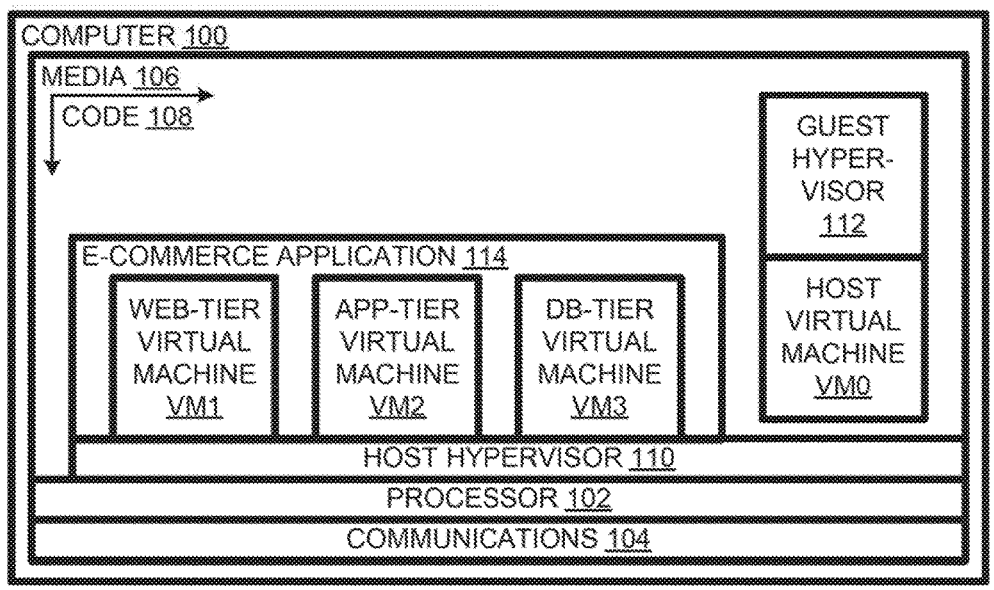
FIG. 4 is a schematic diagram of the computer of FIG. 1 after creation of the host virtual machine but before migration of other virtual machines to a guest hypervisor executing in the host virtual machine of FIG. 1.

Snapshot 130 is taken as part of a snapshot process 200, flow charted in FIG. 2. The starting point for process 200 is shown in FIG. 3. At 201 in process 200, host hypervisor 110 creates host-virtual machine VM0 with guest hypervisor 112 as its guest operating system, yielding computer system 100 as represented in FIG. 3. At 202, virtual machines VM1, VM2, and VM3 are migrated from host hypervisor 110 to guest hypervisor 112, yielding computer system 100 as represented in FIG. 1. At 204, snapshot 130 is taken.

Figure 5:
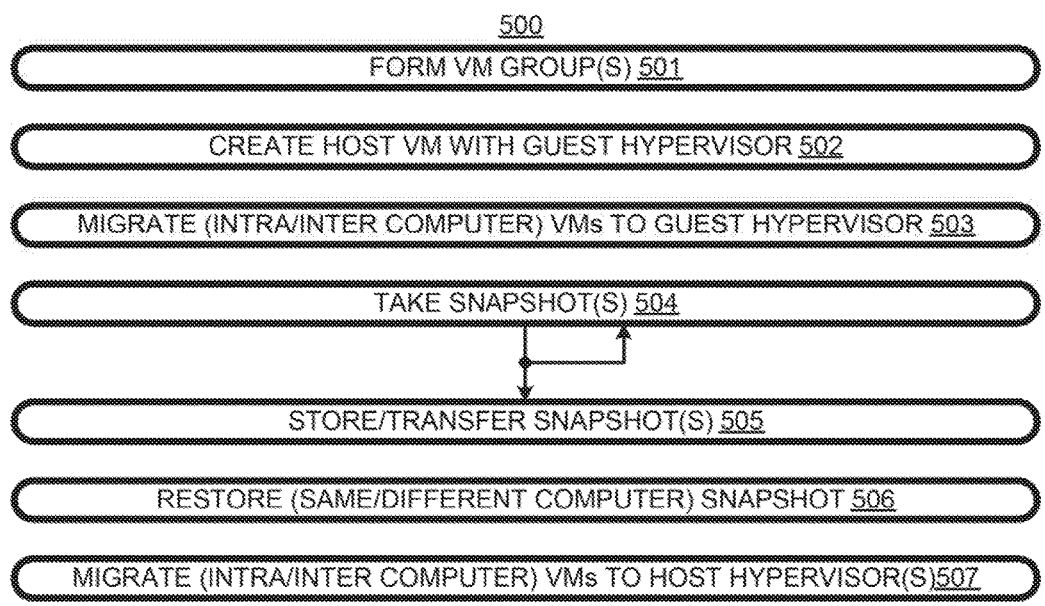
FIG. 5 is a flow-chart of a snapshot process described with respect to FIGS. 6-9.
Figure 6:
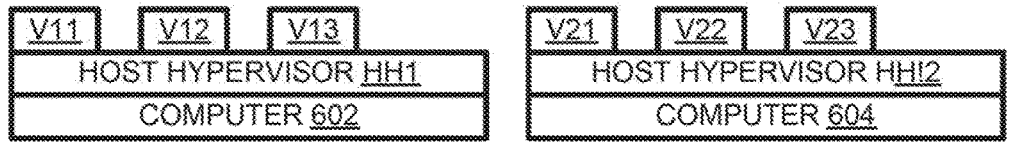
FIG. 6 is a schematic diagram of two computers with respective host hypervisors, with virtual machines running thereon.

In a snapshot process 500, flow charted in FIG. 5, a snapshot is taken of virtual machines that initially resided on different computers. The starting point for process 500 is shown in FIG. 6. initially, virtual machines V11, V12, and V13 run on a host hypervisor HH1, which, in turn, runs on a computer 602; virtual machines V21, V23, and V33 run on a host hypervisor HH2, which, in turn, runs on a computer 604. More generally, process 500 can accommodate any number of virtual machines distributed among any number of computers.

Figure 7:
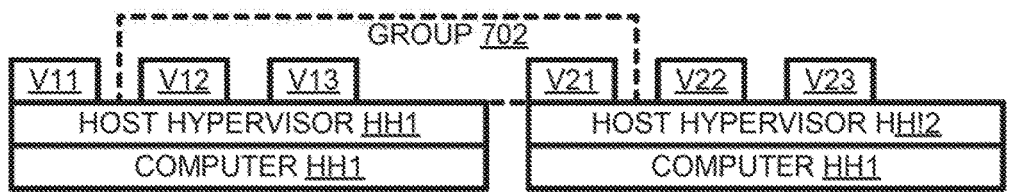
FIG. 7 is a schematic diagram of the two computers of FIG. 6 with three virtual machines selected to belong to a group.

At 501, FIG. 5, a group 702 of the virtual machines is defined, as indicated in FIG. 7. The virtual machines in the group may be from the same computer or from different computers. In FIG. 7, two virtual machines, V12 and V13 are from computer 602, while one virtual machine V21 is from computer 604. More generally, any number of virtual machines from any number of computers can be selected for inclusion in the group. The virtual machines selected for the group are to be the subjects of a multi-VM snapshot. As there may be practical limits on the number of virtual machines that can be included in a snapshot, the group may but preferably would not include virtual machines that do not need to be included together in a snapshot. Instead of selecting one group, multiple groups of virtual machines can be selected for migration to respective guest hypervisors.

Figure 8:
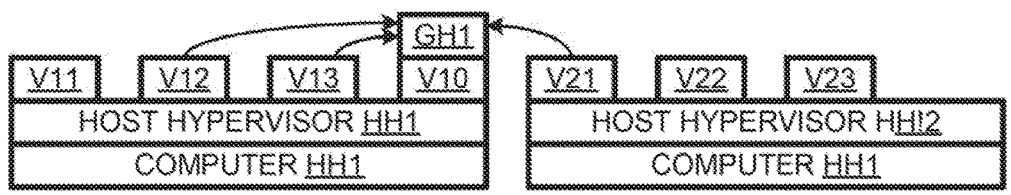
FIG. 8 is a schematic diagram of the two computers of FIGS. 6 and 7 after the creation of a host virtual machine and a guest hypervisor. Arrows represent migrations of the grouped virtual machines to the guest hypervisor.

At 502, FIG. 5, a host hypervisor creates a host virtual machine with a guest hypervisor running thereon. As shown in FIG. 8, host hypervisor HH1 creates a host virtual machine V10, which, in turn, hosts a guest hypervisor GM1. More generally, the host virtual machine can be created on any computer, whether or not the computer includes any of the virtual machines to be migrated to the host virtual machine.

Figure 9:
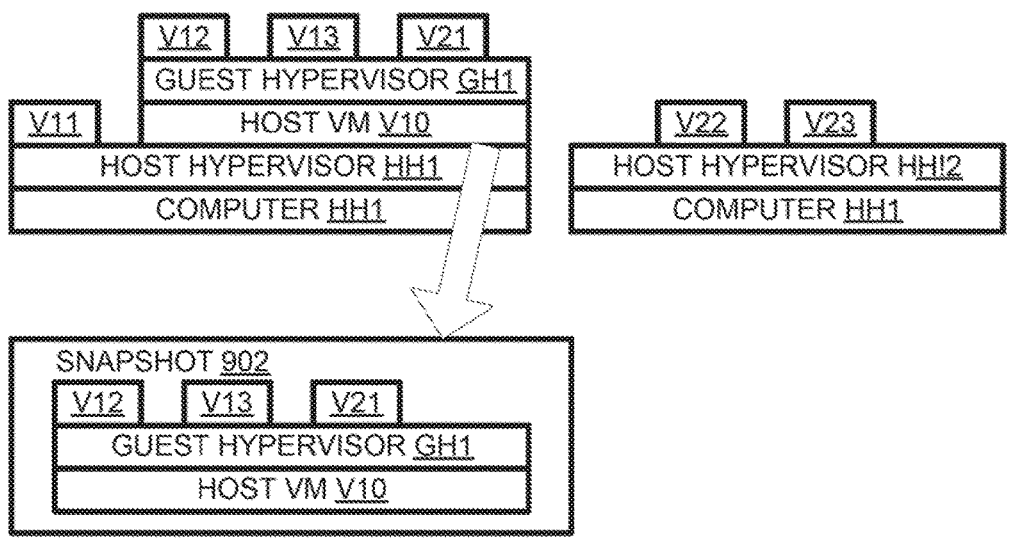
FIG. 9 is a schematic diagram of the two computers of FIG. 8 after the migration of the grouped virtual machines to the guest hypervisor. In addition, a snapshot of the guest virtual machine is shown.

At 503, FIG. 5, the virtual machines of group 702 are migrated to the guest hypervisor, as indicated by arrows in FIG. 8, if there are multiple groups, they can be migrated to respective guest hypervisors on the same or on different computers. The result is shown in FIG. 9. Note that virtual machine V11 remains on host hypervisor HH1, and is not migrated to guest hypervisor GH1.

At 504, FIG. 5, a snapshot 902 is taken, by host hypervisor HH1, of host virtual machine V10. This snapshot includes the state data for virtual machines V12, V13, and V21, the members of group 702. As indicated by the return arrow to 504 in FIG. 5, a series of snapshots may be taken without further migration of the group virtual machines.

At 505, the snapshot or snapshots can be stored locally or remotely. At 506, the snapshot can be retrieved and restored, either to the same computer or to a different computer. As in FIG. 8, the restored snapshot will include virtual machines running on a guest hypervisor. They may be re-migrated to one or more host hypervisors at 507.

Herein, a "hypervisor" is a virtualizing operating system that supports virtual machines. Herein, a "host hypervisor" is a hypervisor that interfaces directly, e.g., not through another hypervisor, with the hardware of a computer. A "guest" hypervisor is a hypervisor that executes on a virtual machine, interfacing with hardware primarily through another hypervisor, e.g., a host hypervisor.

Herein, art labeled "prior art", if any, is admitted prior art. Art not labeled "prior art" is not admitted prior art. The mentioned and other variations upon and modifications to the illustrated embodiments are provided for by the present invention, the scope of which is defined by the following claims.

What is claimed is:

1. A snapshot process comprising:
    creating, by a host hypervisor, a host virtual machine and a guest hypervisor, the guest hypervisor executing on the host virtual machine, the host hypervisor executing on a first computer;
    migrating virtual machines to the guest hypervisor; and
    taking, by the host hypervisor, a snapshot of the host virtual machine, the snapshot including state data for the virtual machines migrated to the guest hypervisor.

2. The snapshot process of claim 1 wherein the virtual machines are migrated from the host hypervisor.

3. The snapshot process of claim 1 wherein at least a first of the migrated virtual machines is migrated from a source other than the host hypervisor.

4. The snapshot process of claim 1 wherein at least a first of the migrated virtual machines is migrated from another computer.

5. The snapshot process of claim 4 wherein the first virtual machine is not migrated to the host hypervisor.

6. The snapshot process of claim 4 wherein the first virtual machine is migrated to the host hypervisor and then from the host hypervisor to the guest hypervisor.

7. A snapshot system comprising non-transitory media encoded with code that, when executed by a processor, causes the processor to implement a process including:
    creating, by a host hypervisor, a host virtual machine and a guest hypervisor, the guest hypervisor executing on the host virtual machine, the host hypervisor executing on a first computer;
    migrating virtual machines to the guest hypervisor; and
    taking, by the host hypervisor, a snapshot of the host virtual machine, the snapshot including state data for the virtual machines migrated to the guest hypervisor.

8. The snapshot system of claim 7 wherein the virtual machines are migrated from the host hypervisor.

9. The snapshot system of claim 7 wherein at least a first of the migrated virtual machines is migrated from a source other than the host hypervisor.

10. The snapshot system of claim 7 wherein at least a first of the migrated virtual machines is migrated from another computer.

11. The snapshot system of claim 10 wherein the first virtual machine is not migrated to the host hypervisor.

12. The snapshot system of claim 11 wherein the first virtual machine is migrated to the host hypervisor and then from the host hypervisor to the guest hypervisor.

13. The snapshot system of claim 7 further comprising the processor.

* * * * *